US009331616B2

(12) United States Patent
Swanson

(10) Patent No.: US 9,331,616 B2
(45) Date of Patent: May 3, 2016

(54) INTEGRATED CIRCUIT FOR MOTOR DRIVE CONTROLLER APPLICATIONS

(71) Applicant: STMicroelectronics, Inc., Coppell, TX (US)

(72) Inventor: David F. Swanson, Belleville, MI (US)

(73) Assignee: STMICROELECTRONICS, INC., Coppell, TX (US)

( * ) Notice: Subject to any disclaimer, the term of this patent is extended or adjusted under 35 U.S.C. 154(b) by 231 days.

(21) Appl. No.: 14/063,163

(22) Filed: Oct. 25, 2013

(65) Prior Publication Data

US 2014/0145666 A1 May 29, 2014

Related U.S. Application Data

(60) Provisional application No. 61/730,672, filed on Nov. 28, 2012.

(51) Int. Cl.

| | |
|---|---|
| ***H02P 7/00*** | (2006.01) |
| ***E05B 81/06*** | (2014.01) |
| ***E05B 77/12*** | (2014.01) |
| ***E05B 81/62*** | (2014.01) |
| ***E05B 81/54*** | (2014.01) |

(52) U.S. Cl.
CPC . *H02P 7/00* (2013.01); *E05B 77/12* (2013.01); *E05B 81/06* (2013.01); *E05B 81/54* (2013.01); *E05B 81/62* (2013.01)

(58) Field of Classification Search
CPC .......... H02P 7/00; E05B 81/54; E05B 77/12; E05B 81/62; E05B 81/06
IPC ............. H02P 7/00; E05B 81/54, 77/12, 81/62
See application file for complete search history.

(56) References Cited

U.S. PATENT DOCUMENTS

| | | | | |
|---|---|---|---|---|
| 6,316,892 | B1 * | 11/2001 | Valencia | 318/293 |
| 2007/0194729 | A1 * | 8/2007 | Kraus | 318/254 |
| 2008/0284500 | A1 * | 11/2008 | Chigira | 327/538 |
| 2010/0115853 | A1 * | 5/2010 | Gebhart et al. | 49/506 |
| 2012/0280728 | A1 * | 11/2012 | Hussein et al. | 327/155 |

* cited by examiner

*Primary Examiner* — Shawki S Ismail
*Assistant Examiner* — Muhammad S Islam
(74) *Attorney, Agent, or Firm* — Gardere Wynne Sewell LLP

(57) ABSTRACT

An integrated circuit is configured for controlling automobile door lock motors. The circuit includes half-bridge driver circuits, with each half-bridge driver circuit having an output node configured to be coupled to a door lock motor. A control circuit is configured to control driver operation of the half-bridge driver circuits. A current regulator circuit senses current sourced by or sunk by at least one of the half-bridge circuits. The control circuit responds to the current regulator circuit and the sensed current by controlling the driver operation to provide for a regulated current to be sourced by or sunk by said half-bridge circuit. The control circuit further controls the half-bridge driver circuits to enter a tri-state mode in order to support the making of BEMF measurements on the motor.

24 Claims, 5 Drawing Sheets

INTEGRATED CIRCUIT FOR MOTOR DRIVE CONTROLLER APPLICATIONS

PRIORITY CLAIM

This application claims the benefit of U.S. Provisional Application for Patent No. 61/730,672 filed Nov. 28, 2012, the disclosure of which is hereby incorporated by reference.

TECHNICAL FIELD

The present invention relates to an Integrated Circuit (IC) device which functions as a controller and, in particular, to an IC controller configured for motor driver applications.

BACKGROUND

For many years, the mechanical door locks on automobiles were solely manual devices. The driver or passengers were required to manually actuate the mechanical door locks to change between the locked and the un-locked states. It is now common for automobiles to include the convenience of automatic door locks. A DC lock motor is provided in association with each mechanical door lock to actuate the mechanism for either locking or unlocking the door under the control of an electrical signal. A mechanical relay circuit is typically used to control the operation of the DC lock motor. One problem with relay control is that the relay is not capable of regulating or limiting current and thus excessive inrush or stall currents may occur within the relay when driving the DC lock motor. Indeed, current in a door lock system can reach, for example, 60 A and such a possible operating condition requires the use of heavier wiring in the wiring harness for the DC lock motor at an increased cost and weight penalty.

The mechanical relay circuit is typically of the single-pole double-throw (SPDT) switch type. The switch is normally switched to ground when not in use. With a ground connection in place, however, there are concerns with a fault mode in the wiring harness where the lock motor could be continuously activated through this ground connection. A potentially dangerous fire condition could arise from continuous actuation of the motor. To address this issue, the circuit designer will typically include a thermal limit protection device in the DC lock motor to sense an over-temperature condition, but this disadvantageously increases the cost of providing the automatic door lock convenience.

Another concern with mechanical relays is noise. A further concern with mechanical relays is jitter or bouncing.

In view of the foregoing, engineers have moved from mechanical relay circuit control to solid state relay circuit control. However, such solid state relays still suffer from the current and fault mode issues discussed above.

It is understood that even with automatic door locks, the driver or passengers may still desire to manually lock or unlock the lock mechanism. Detection of manual actuation of the lock is accordingly a desirable feature. As the lock mechanism is coupled to the DC lock motor, one way to accomplish this detection is to monitor the back electromotive force (BEMF) of the DC lock motor. However, with the relay switch connection to ground that is common practice in prior art designs the BEMF detection is not possible.

Modern automobiles are required to possess accident detection systems (and are now moving towards collision avoidance systems). Such systems are commonly used to trigger air bag deployment or other evasive action and may further be used to control other operations such as automatically contacting first responders and controlling the operation of the automatic door locks. With respect to the door locks, the common operation modes are to lock the doors in response to accident detection and then unlock the doors after the accident to permit first responders to enter the vehicle. Relay circuits, however, are inherently slow devices which cannot react in the less than a few hundred millisecond reaction time needed to ensure that the doors are locked in response to the detected accident.

In view of the foregoing, there is a need in the art for an improved automatic door lock motor driver circuit which would preferably be implemented in an integrated circuit format.

SUMMARY

In an embodiment, a system comprises: a door lock mechanism for an automobile; a motor configured to actuate the door lock mechanism; an integrated circuit motor driver comprising: a half-bridge driver circuit having an output node electrically coupled to said motor; a control circuit configured to control driver operation of the half-bridge driver circuit; and a regulator circuit configured to sense and regulate an operational parameter of the half-bridge driver circuit and motor; wherein the control circuit is further configured to respond to the regulator circuit and the sensed operational parameter by controlling the driver operation to provide for a regulated operation of the half-bridge circuit and motor.

In an embodiment, an integrated circuit configured to control automobile door lock motors comprises: a plurality of half-bridge driver circuits integrated within the circuit, each half-bridge driver circuit having an output node configured to be electrically coupled to a door lock motor; a control circuit integrated within the circuit and configured to control driver operation of the half-bridge driver circuits; and a regulator circuit integrated within the circuit and configured to sense an operational parameter of at least one of the plurality of half-bridge circuits; wherein the control circuit is further configured to respond to the regulator circuit and the sensed operational parameter by controlling the driver circuit operation to provide for a regulated motor operation.

In an embodiment, a circuit comprises: a first drive transistor having a gate terminal, wherein a source-drain path of the first transistor is configured to be coupled to drive operation of a motor; a first current sensing resistor coupled to sense current flowing in said motor; a first comparator configured to compare a voltage at the first current sensing resistor with a first reference voltage and generate a first output signal; a first flip-flop circuit having a first input configured to receive the first output signal and a second input configured to receive an oscillating signal, said first flip-flop circuit generating a first PWM output signal; and a logic circuit coupled to receive the first PWM output signal and configured to generate a first control signal for application to the gate of the first drive transistor (for example, for implementing current regulation).

In an embodiment, the circuit further comprises a second drive transistor having a gate terminal, wherein a source-drain path of said second drive transistor coupled in series with the source-drain path of said first drive transistor; a second current sensing resistor coupled to sense current flowing in said motor; a second comparator configured to compare a voltage at the second current sensing resistor with a second reference voltage and generate a second output signal; a second flip-flop circuit having a first input configured to receive the second output signal and a second input configured to receive an oscillating signal, said second flip-flop circuit generating a second PWM output signal; and wherein said logic circuit is further coupled to receive the second PWM output signal and configured to generate a second control signal for application to the gate of the second drive transistor (for example for implementing current regulation).

The first and second transistors may each comprise a primary source-drain path coupled to the motor and a secondary source-drain path coupled to the current sensing resistor.

Operation of the first and second transistors in tri-state mode is also supported to enable measurement of back EMF on the motor.

The control signals for the first and second transistors control operation so as to provide a regulated motor current.

BRIEF DESCRIPTION OF THE DRAWINGS

For a better understanding of the embodiments, reference will now be made by way of example only to the accompanying figures in which.

DETAILED DESCRIPTION OF THE DRAWINGS

Figure 1:
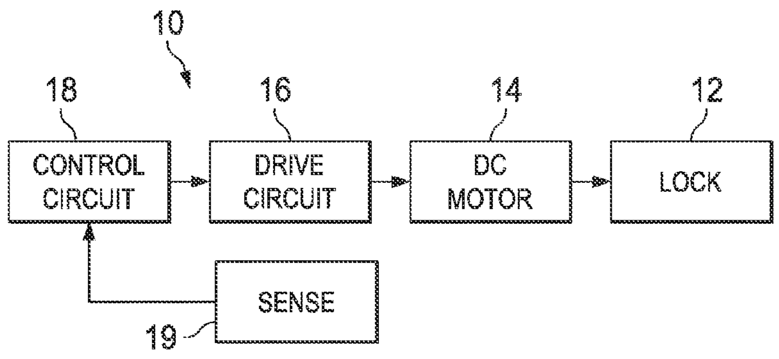
FIG. 1 illustrates a block diagram of an automatic door lock system.

Reference is now made to FIG. 1 which illustrates a block diagram of an automatic door lock system 10. The system 10 includes a door lock mechanism 12, a DC motor 14 mechanically coupled to drive the operation of the door lock mechanism 12 between its locked and unlocked states, a driver circuit 16 electrically coupled to the DC motor 14 and a control circuit 18 electrically coupled to the driver circuit 16. A sensing circuit 19 is provided to sense operation of the driver circuit 16 and/or the DC motor 14 and provide feedback to the control circuit 18.

The door lock mechanism 12 is of conventional type known to those skilled in the art. The shaft of the DC motor 14 is mechanically coupled to the door lock mechanism 12 in manner such that rotation of the motor in one direction will cause the door lock mechanism 12 to enter the unlocked state and rotation of the motor in the opposite direction will cause the door lock mechanism 12 to enter the locked state. It will be understood that the door lock mechanism 12 may alternatively be single-directional, such as when the door lock mechanism is used for a trunk lock and in such a case the rotation of the motor causes the mechanism to enter into only one of the locked or unlocked states.

The DC motor 14 is also of conventional type known to those skilled in the art. For example, the motor 14 may operate at a voltage of between 9 V and 16 V which is compatible with the battery voltage available in automobiles. The motor is designed to output sufficient torque to actuate the door lock mechanism 12.

The driver circuit 16 is typically of the bridge-type.

Figure 2A:
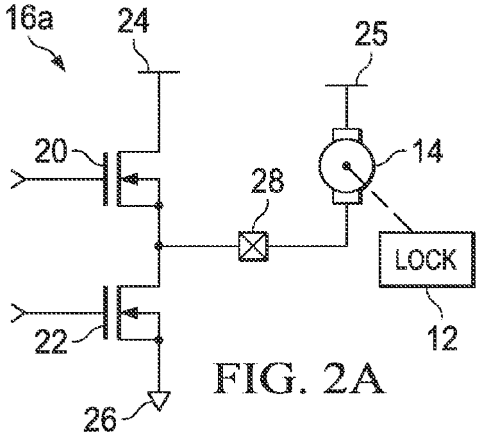
FIGS. 2A and 2B illustrate circuit diagrams of bridge driver circuits.

For example, the driver circuit may comprise a half-bridge driver 16*a* (see, FIG. 2A) including first and second series connected drive transistors 20 and 22 (for example, n-channel power mosfet devices with series connected source-drain paths). The series connected driver transistors 20 and 22 are connected between a power supply node 24 and a ground supply node 26. The series connection node 28 is an output node for the half-bridge driver 16*a* which is coupled to one electrical terminal of the DC motor 14 (which functions as the load). The other electrical terminal of the motor 14 is connected to a reference supply node 25 (illustrated here as a positive supply node, but understanding that node 25 could alternatively comprise a ground node). Control over operation of the half-bridge driver 16*a* is exercised through the gate (control) terminals of the drive transistors 20 and 22 (with the control circuit 18 functioning as a gate driver). When transistor 22 is driven into conduction, and transistor 20 is not conducting, current flows through the motor causing the motor shaft to rotate. When transistor 20 is driven into conduction, and transistor 22 is not conducting, the motor is commanded to the off condition and the energy stored in the windings of the motor is released and motor shaft stops rotating.

Figure 2B:
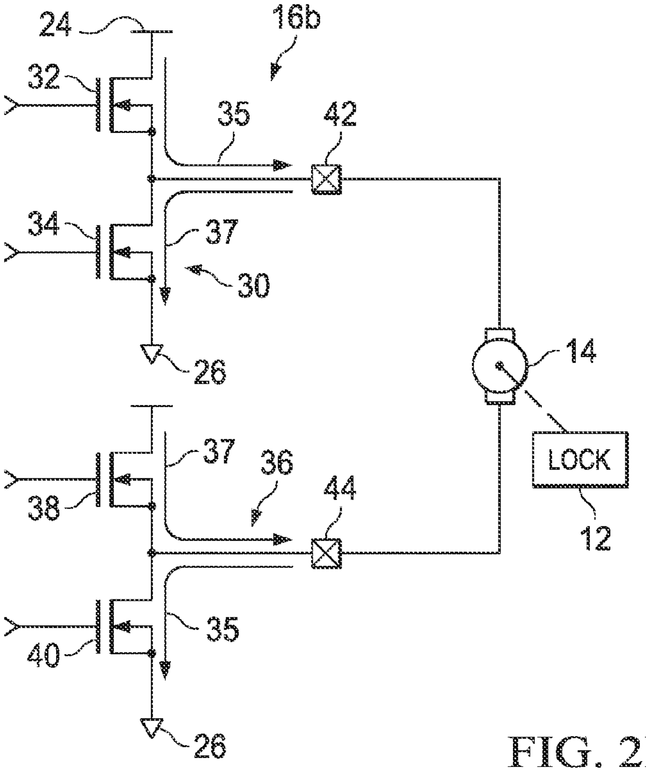

As another example, the driver circuit may comprise a full-bridge driver 16*b* (see, FIG. 2B) including a first half-bridge 30 with first and second series connected drive transistors 32 and 34 (for example, n-channel power mosfet devices with series connected source/drain paths) and a second half-bridge 36 with first and second series connected drive transistors 38 and 40 (for example, n-channel power mosfet devices with series connected source/drain paths). The series connected driver transistors 32 and 34 are connected between the power supply node 24 and the ground supply node 26. The series connected driver transistors 38 and 40 are also connected between the power supply node 24 and the ground supply node 26. The series connection nodes 42 and 44 are output nodes for the half-bridges, respectively, and are each coupled to one electrical terminal of the DC motor 14 (which functions as the load). Control over operation of the full-bridge driver 16*b* is exercised through the gate (control) terminals of the drive transistors 32, 34, 38 and 40 (with the control circuit 18 functioning as a gate driver). When transistors 32 and 40 are driven into conduction, and transistors 34 and 38 are not conducting, current flows through the motor in a first direction 35 causing the motor shaft to rotate in a first rotation direction. Conversely, when transistors 34 and 38 are driven into conduction, and transistors 32 and 40 are not conducting, current flows through the motor in a second (opposite) direction 37 causing the motor shaft to rotate in a second (opposite) rotation direction.

The control circuit 18 is configured to control operation of the driver circuit 16 (of either the half-bridge driver 16*a* type or the full-bridge driver 16*b* type). In particular, the control circuit 18 is configured to provide for regulation of driver operation, and in particular a current regulation with respect to operation of the motor.

The sensing circuit 19 may comprise, for example, a current sensing circuit configured to sense, either directly or indirectly, current flowing to the motor 14 from the drive circuit 16. The sensed current information is fed back to the control 18 and used to modulate operation of the drive circuit in order to provide regulation of motor current. The sensing circuit 19 may further operate to sense other parameters of motor and/or driver operation. The current sensing circuit may operate to directly measure current flowing to the motor or indirectly measure current flowing to the motor.

Figure 3A:
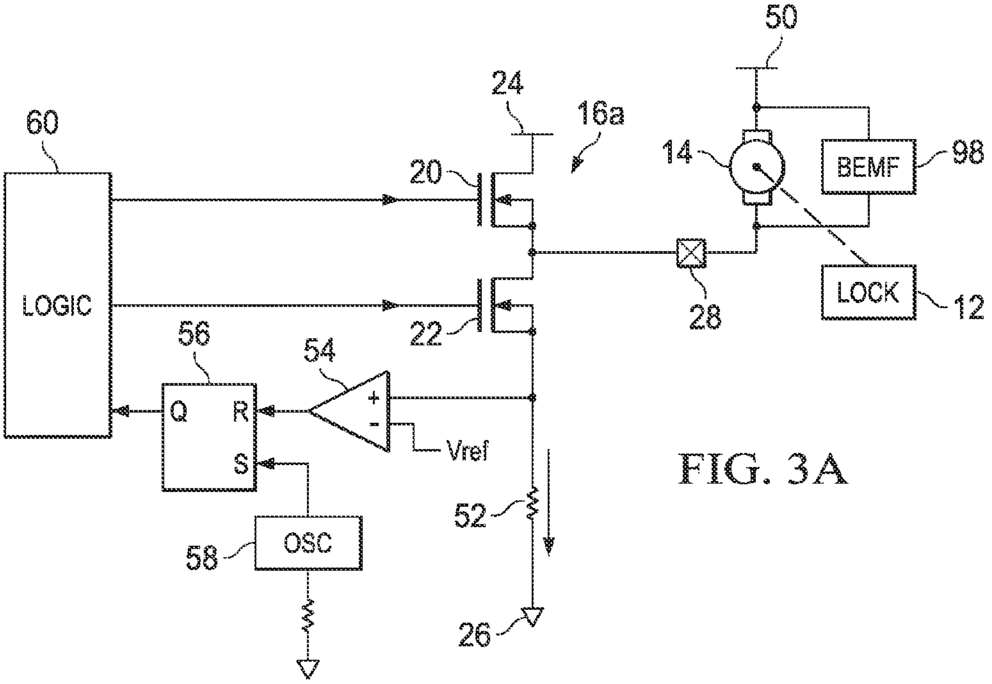
FIGS. 3A and 3B are block diagrams of current regulation embodiments.

Reference is now made to FIG. 3A which shows a circuit diagram for current regulation with respect to the operation of the driver circuit 16 in the half-bridge driver 16*a* configuration. The electrical terminals of the motor 14 are coupled, respectively, to a reference supply node 50 and the series connection node 28 of series connected drive transistors 20 and 22. The reference supply node 50 may comprise a regulated or unregulated voltage derived from the supply associated with the power supply node 24 and ground supply node 26. In an embodiment, the voltage at the reference supply node 50 may be one-half the voltage at the power supply node 24.

In connection with an embodiment to make a direct measurement of current, a current sense resistor 52 is coupled in series with the source-drain paths of the drive transistors 20 and 22 (for example, between the drain node of the transistor 22 and the ground supply node 26). In an alternative embodiment for performing an indirect measurement of load (motor) current, the transistor 22 is divided into a primary transistor and a secondary transistor connected in a mirror configuration (wherein the secondary transistor is a much smaller replica of the primary transistor and the gates of the primary and second transistors are tied together). Alternatively, the secondary transistor is simply a portion of the primary transistor whose source or drain terminals are separately accessible. The concept of primary and secondary transistors is considered to encompass either configuration. Instead of connecting the sense resistor in series with the primary transistor driving the motor (load), the sense resistor is connected in series with the secondary transistor (see, FIG. 5, for example).

The current sense resistor 52 converts the directly or indirectly sensed current flowing through the motor 14 to a voltage. The voltage, which is indicative of the sensed current, is compared to a reference voltage Vref at a comparator circuit 54. The output of the comparator circuit is applied to the reset input of a set/reset flip-flop 56. The set input of the flip-flop 56 receives an oscillator signal generated by an oscillator circuit 58. The circuit is thus understood by those skilled in the art to be a fixed frequency PWM current control circuit. The true output of the flip-flop is a PWM control signal applied to a gate drive logic circuit 60 which generates the gate drive signals for application to the gates of the drive transistors 20 and 22.

Figure 4A:
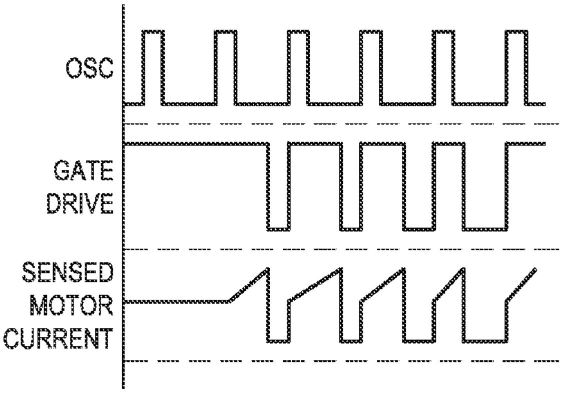
FIGS. 4A and 4B are waveform diagrams illustrating operation of the current regulation embodiments of FIGS. 3A and 3B.

FIG. 4A provides waveforms illustrating the operation of the circuit of FIG. 3A. When the sensed motor current represented by the voltage across resistor 52 exceeds the reference voltage Vref, the flip-flop 56 is reset and the PWM control signal goes low. The gate drive logic responds to the logic low PWM control signal by turning off transistor 22 and turning on transistor 20. The flip-flop 56 is then set in response to the next rising edge of the oscillator signal output from oscillator circuit 58 and the PWM control signal goes high. The gate drive logic responds to the logic high PWM control signal by turning on transistor 22 and turning off transistor 20.

Figure 3B:
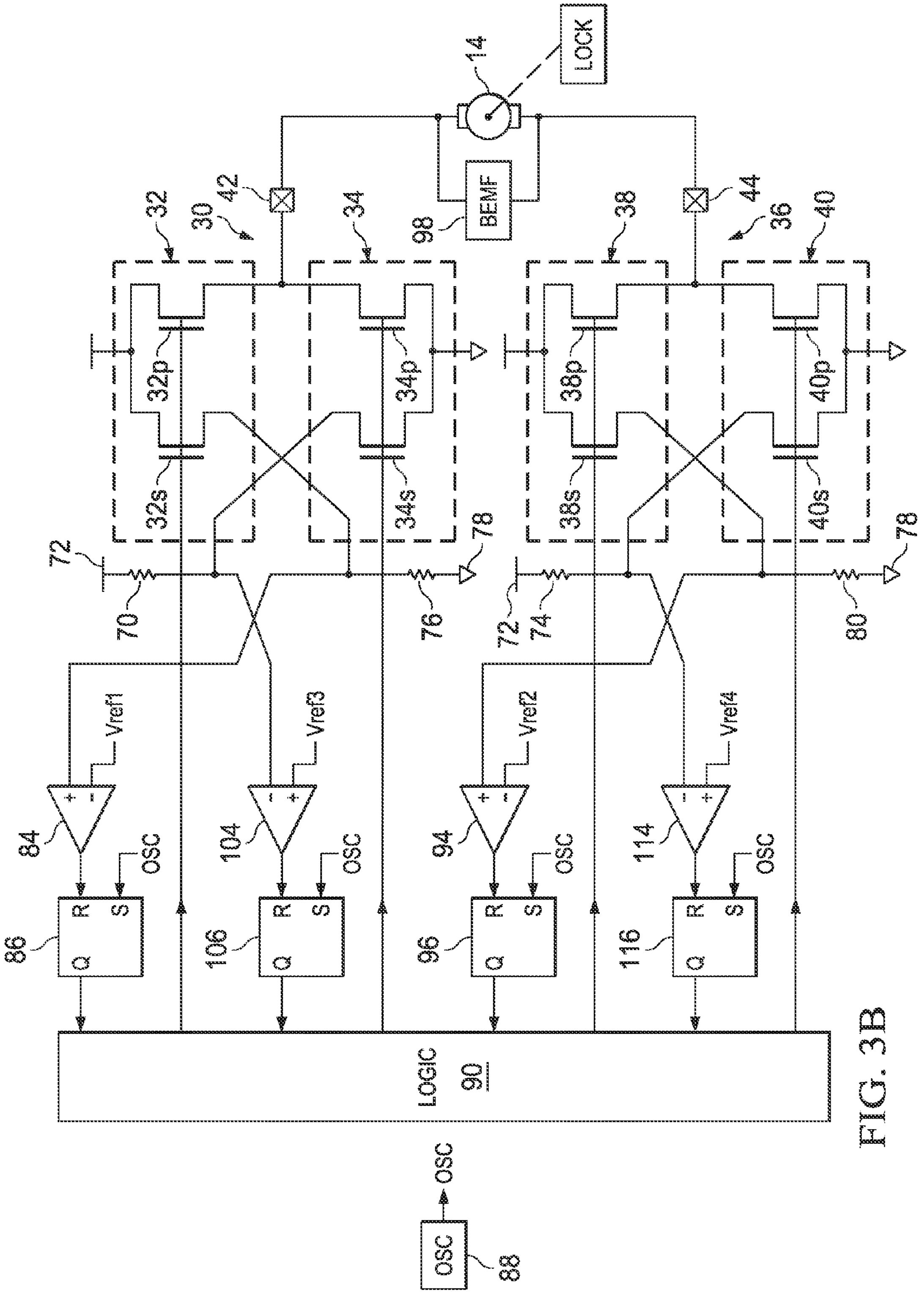

Reference is now made to FIG. 3B which shows a circuit diagram for current regulation with respect to the operation of the driver circuit 16 in the full-bridge driver 16*b* configuration. The electrical terminals of the motor 14 are coupled, respectively, to the series connection node 42 of series connected drive transistors 32 and 34 and the series connection node 44 of series connected drive transistors 38 and 40.

The illustration of two transistors for the transistor 32 indicates that transistor 32 is actually configured as a primary transistor and a secondary transistor connected in a mirror configuration (as discussed above, for example, wherein the secondary transistor is a much smaller replica of the primary transistor (or a portion of the primary has separately accessible drain terminals) and the gates of the primary and secondary transistors are tied together). The primary transistor is designated 32*p* and the secondary transistor is designated 32*s*.

The illustration of two transistors for transistor 34 indicates that transistor 32 is actually configured as a primary transistor and a secondary transistor connected in a mirror configuration (as discussed above, for example, wherein the secondary transistor is a much smaller replica of the primary transistor (or a portion of the primary has separately accessible source terminals) and the gates of the primary and secondary transistors are tied together). The primary transistor is designated 34*p* and the secondary transistor is designated 34*s*.

The illustration of two transistors for transistor 38 indicates that transistor 38 is actually configured as a primary transistor and a secondary transistor connected in a mirror configuration (as discussed above, for example, wherein the secondary transistor is a much smaller replica of the primary transistor (or a portion of the primary has separately accessible drain terminals) and the gates of the primary and secondary transistors are tied together). The primary transistor is designated 38*p* and the secondary transistor is designated 38*s*.

The illustration of two transistors for transistor 40 indicates that transistor 40 is actually configured as a primary transistor and a secondary transistor connected in a mirror configuration (as discussed above, for example, wherein the secondary transistor is a much smaller replica of the primary transistor (or a portion of the primary has separately accessible source terminals) and the gates of the primary and secondary transistors are tied together). The primary transistor is designated 40*p* and the secondary transistor is designated 40*s*.

The drain terminal of primary transistor 32*p* and the source terminal of primary transistor 34*p* are connected together at connection node 42. The drain terminal of primary transistor 38*p* and the source terminal of primary transistor 40*p* are connected together at connection node 44.

A first resistor 70 is coupled between a reference voltage node 72 and the source terminal of the secondary transistor 34*s*. The source terminal of the primary transistor 34*p* is connected to connection node 42. The resistor 70 is accordingly coupled in series with the secondary transistor 34*s* and functions as a current sensor for indirectly sensing current delivered by the primary transistor 34*p* since the current flowing through secondary transistor 34*s* is a fractional replica of the current flowing through primary transistor 34*p* and motor 14.

A second resistor 74 is coupled between the reference voltage node 72 and the source terminal of the secondary transistor 40*s*. The source terminal of the primary transistor 40*p* is connected to connection node 44. The resistor 74 is accordingly coupled in series with the secondary transistor 40*s* and functions as a current sensor for indirectly sensing current delivered by the primary transistor 40*p* since the current flowing through secondary transistor 40*s* is a fractional replica of the current flowing through primary transistor 40*p* and motor 14.

A third resistor 76 is coupled between a ground reference voltage node 78 and the drain terminal of secondary transistor 32*s*. The drain terminal of the primary transistor 32*p* is connected to connection node 42. The resistor 76 is accordingly coupled in series with the secondary transistor 32*s* and functions as a current sensor for indirectly sensing current delivered by the primary transistor 32*p* since the current flowing through secondary transistor 32*s* is a fractional replica of the current flowing through primary transistor 32*p* and motor 14.

A fourth resistor 80 is coupled between a ground reference voltage node 78 and the drain terminal of secondary transistor 38*s*. The drain terminal of the primary transistor 38*p* is connected to connection node 44. The resistor 80 is accordingly coupled in series with the secondary transistor 38*s* and functions as a current sensor for indirectly sensing current delivered by the primary transistor 38*p* since the current flowing through secondary transistor 38*s* is a fractional replica of the current flowing through primary transistor 38*p* and motor 14.

When transistors 32 and 40 are activated, and transistors 34 and 38 are deactivated, current flows through the motor 14 in a first direction and this current is sensed by one or the other or both of the resistors 74 and 76 for the purpose of current regulation or protection (i.e., over-current detection). Conversely, when transistors 34 and 38 are activated, and transistors 32 and 40 are deactivated, current flows through the motor 14 in a second (opposite) direction and this current is directly or indirectly sensed by one or the other or both of the resistors 70 and 80 for the purpose of current regulation or protection.

The driver circuit 16 includes four regulation circuits.

In a first regulation circuit, the current sense resistor 70 converts the sensed current flowing through the motor 14 (i.e., the current being sunk through transistor 34) to a voltage. The sensed voltage is compared to a first reference voltage Vref1 at a first comparator circuit 84. The output of the comparator circuit is applied to the reset input of a set/reset flip-flop 86. The set input of the flip-flop 86 receives an oscillator signal (Osc.) generated by an oscillator circuit 88. The circuit is thus understood by those skilled in the art to be a fixed frequency PWM current control circuit. The true output of the flip-flop is a PWM control signal applied to a gate drive logic circuit 90 which generates the gate drive signals for application to the gate of the drive transistors 34 and 32 in an active freewheeling method.

In a second regulation circuit, the current sense resistor 74 converts the sensed current flowing through the motor 14 (i.e., the current being sunk through transistor 40) to a voltage. The sensed voltage is compared to a second reference voltage Vref2 at a second comparator circuit 94. The output of the comparator circuit is applied to the reset input of a set/reset flip-flop 96. The set input of the flip-flop 96 receives an oscillator signal generated by the oscillator circuit 88. The circuit is thus understood by those skilled in the art to be a fixed frequency PWM current control circuit. The true output of the flip-flop is a PWM control signal applied to the gate drive logic circuit 90 which generates the gate drive signals for application to the gate of the drive transistors 40 and 38 in an active freewheeling method.

In a third regulation circuit, the current sense resistor 76 converts the sensed current flowing through the motor 14 (i.e., the current being sourced by transistor 32) to a voltage. The sensed voltage is compared to a third reference voltage Vref3 at a third comparator circuit 104. The output of the comparator circuit is applied to the reset input of a set/reset flip-flop 106. The set input of the flip-flop 106 receives an oscillator signal generated by the oscillator circuit 88. The circuit is thus understood by those skilled in the art to be a fixed frequency PWM current control circuit. The true output of the flip-flop is a PWM control signal applied to the gate drive logic circuit 90 which generates the gate drive signals for application to the gate of the drive transistors 32 and 34 in an active freewheeling method.

In a fourth regulation circuit, the current sense resistor 80 converts the sensed current flowing through the motor 14 (i.e., the current being sourced by transistor 38) to a voltage. The sensed voltage is compared to a fourth reference voltage Vref4 at a fourth comparator circuit 114. The output of the comparator circuit is applied to the reset input of a set/reset flip-flop 116. The set input of the flip-flop 116 receives an oscillator signal generated by the oscillator circuit 88. The circuit is thus understood by those skilled in the art to be a fixed frequency PWM current control circuit. The true output of the flip-flop is a PWM control signal applied to the gate drive logic circuit 90 which generates the gate drive signals for application to the gate of the drive transistors 38 and 40 in an active freewheeling method.

Although the flip-flops are shown outside of the logic circuit 90 it will be understood that the flip-flops comprise logic circuitry and thus could be included within the logic circuit 90.

The voltage at the reference voltage node 72 should exceed the reference voltage Vref for the comparators. In a preferred implementation, the voltage at the reference voltage node 72 is fixed. In a preferred embodiment, the voltages for Vref1 and Vref3 are adjusted in reference to the voltage at node 72 for the purpose of setting the current regulation or overcurrent thresholds. In a preferred embodiment, the voltages for Vref2 and Vref4 are adjusted in reference to the voltage at node 78 for the purpose of setting the current regulation or overcurrent thresholds. The reference voltages Vref1-Vref4 may be generated by a programmable threshold generator circuit.

The driver current limiting circuits may be linked together for parallel operation. Additionally, regulation can be provided on the high side of the motor 14 or on the low side of the motor 14. The regulation operation may further provide overcurrent protection.

The circuit may further include a back EMF (BEMF) sensing circuit 98 coupled across the terminals of the motor 14. The logic 90 is further configured to control the gate (control terminal) drive signals applied to the transistors of the half-bridge circuits so as to place the half-bridge circuits in a tri-state mode. When in the tri-state mode, the BEMF sensing circuit 98 is operable to make a BEMF detection. For example, such a detection would indicate shaft rotation of the motor 14. In the door lock application shown in FIG. 1, for example, such a shaft rotation would occur when a person manually operates the door lock mechanism and imparts a torque on the motor shaft. This manual actuation of the door lock mechanism is thus easily detected through the BEMF sensing circuit 98.

The BEMF sensing circuit 98 may also be provided in connection with the circuit shown in FIG. 3A.

Figure 4B:
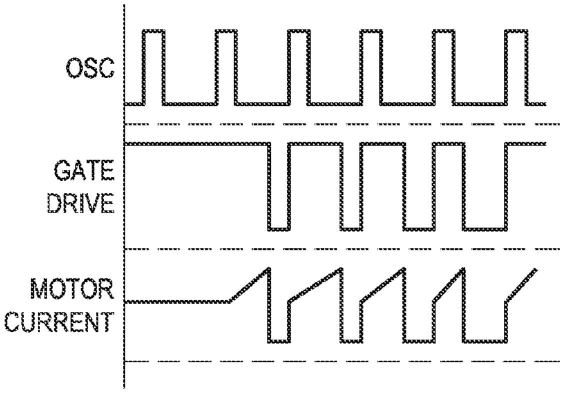

FIG. 4B provides waveforms illustrating the operation of one of the circuits of FIG. 3B. When the sensed motor current represented by the voltage across sense resistor exceed the reference voltage Vref, the flip-flop is reset and the PWM control signal goes low. The gate drive logic responds to the logic low PWM control signal by turning off the transistor. The flip-flop is then set in response to the next rising edge of the oscillator signal output from oscillator circuit and the PWM control signal goes high. The gate drive logic responds to the logic high PWM control signal by turning on transistor.

It will accordingly be recognized that the foregoing presents a solid state drive solution for motor control in connection with door lock motors and mechanisms. By selection of the appropriate reference voltages for the comparators, motor current can be limited to the low end of current needed for motor operation. Limiting current in this manner reduces inrush current. Furthermore, because of reduced and limited current, the requirements for the wiring harness can be reduced and cost is decreased while still permitting sufficient motor current/torque to generated for actuating the lock motor.

The use of the solid state solution with the bridge drivers presents another advantage. The control signals to the gate (control) terminals of the drive transistors can be configured to place the bridge circuitry in a tri-state condition. There is no active ground connection in the tri-state condition and thus the fault mode concerns with prior art relay-based solutions are obviated.

Additionally, the tri-state condition at the motor electrical terminals permits other circuitry to make an accurate back EMF sensing on the motor. This is important because the sensed back EMF signal can be used to indicate that the door lock mechanism has been manually actuated.

A further advantage of the current regulated solid state solution relates to improved reaction/actuation time in comparison to the prior art relay-based solution. The door motor can be quickly actuated in the event of a detected accident condition so as to ensure the doors are properly locked.

A further advantage provides for a lower current actuation reducing the overall cost of the silicon required to realize a solid state solution. Prior to this methodology the solid state solution was too expensive to implement. This provides a cost effective method for implementing solid state door lock actuation.

Each automobile may include multiple door lock mechanisms which can be automatically controlled. Each door lock mechanism would have its own associated motor. For circuit efficiency, multiple ones of the motors can share a common half-bridge driver, for example on one side of the motor. On the other side of the motor, separate half bridge drivers can be provided in situations where individual control over the motor needs to be exercised. For example, the driver's side door motor may have its own other side half bridge driver while the remaining door motors share a common other side half bridge driver. A separate driver circuit can also be provided with respect to the door lock for the trunk or hatch of the automobile. Notwithstanding the sharing of bridge drivers, the disclosed regulation circuit will function to limit inrush current below a maximum level.

In summary, the solution accordingly presents a number of advantages:

- provides a lower current system by: a) reducing wiring harness weight; b) improving gas mileage; c) reducing stress on the lock motor and lock mechanisms; d) increasing usable life span of components; e) lowering the semiconductor cost of the solid state solution;
- improves reliability by avoiding the use of relays whose contacts can corrode or fail to actuate;
- improves safety by supporting a rapid door lock actuation at the onset of an accident so as to avoid instances of unintentional door opening and passenger discharge during the accident and while the vehicle is subjected to rapid changes in speed; and
- supports door lock status detection through the sensing of back EMF.

In a preferred implementation, the circuitry is provided in the form of an integrated circuit chip.

Figure 5:
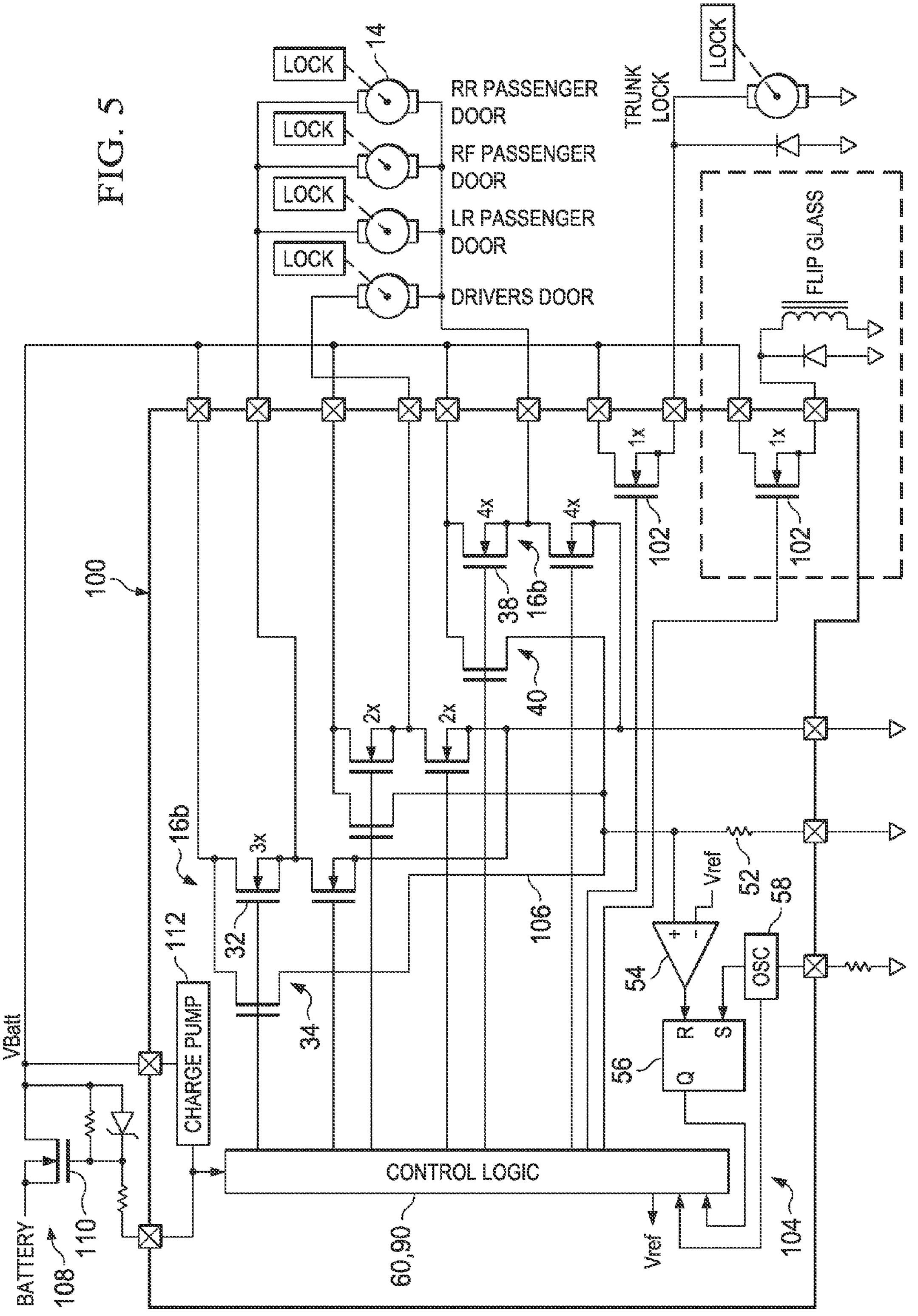
FIGS. 5 and 6 are block diagrams of an integrated circuit for motor control.

Reference is now made to FIG. 5 which presents a block diagram of an integrated circuit 100 for motor control. The integrated circuit includes a plurality of half-bridge driver circuits 30 and 36 which can be configured to provide a full bridge driver 16*b* (see, FIG. 2B). It will also be understood that the half-bridge driver circuits could alternatively or additionally be used as half-bridge drivers 16*a* (see, FIG. 2A). In the exemplary circuit 100, the integration includes three half bridge drivers and two power transistors 102. The gates (control terminals) of the transistors are coupled to a control logic circuit 60/90.

It will be noted that the upper transistor of each half-bridge has two source terminals. As discussed above, this indicates that the transistor is configured to include a primary transistor and a secondary transistor connected in a mirror configuration (wherein the secondary transistor is a much smaller replica of the primary transistor and the gates of the primary and second transistors are tied together). The source terminal of the upper primary transistor is provided with a connection directly to a ground reference node. The source terminal of the upper secondary transistor is provided with an indirect connection to a ground reference node through a sense resistor 52. This circuit configuration supports the sensing operation illustrated in FIG. 3B.

Thus, the integrated circuit 100 further includes a PWM current regulation circuit 104 having the configuration and operation as described above. In this implementation, only one circuit 104 is included and this circuit has its input node 106 coupled to the source terminals of the secondary upper transistor in each of the three half bridge drivers. In an alternative embodiment, multiple circuits 104 may be provided, for example separately connected to a corresponding source terminal of the secondary upper transistor in one of the three half bridge drivers (see, FIG. 3B).

FIG. 5 further illustrates the relative size differences of the included half-bridge circuits and this enables the circuits to handle different load conditions. Proper selection of the half-bridge circuits should be made in accordance with load needs and the differences in relative transistor size.

FIG. 5 still further illustrates an exemplary connection of DC door motors 14 to the half bridge drivers. It will be noted that all motors 14 share one of the half bridge drivers. Another of the half bridge drivers is connected to the motor 14 for the driver's side door lock mechanism. Yet another of the half bridge drivers is connected to the motors 14 for the other door lock mechanisms. In this way individual control may be exercised over the driver's side door lock mechanism, and simultaneous control may be exercised over the other door lock mechanisms.

One additional transistor 102 is provided to enable control over a motor for the trunk lock (which may, for example, only need to be actuated in a single direction). Current regulation is not shown provided for this motor, but it will be understood that is could be provided if desired.

Another additional transistor 102 is provided to enable control over a solenoid latching circuit such as that used for flip glass assemblies.

Power to the source terminals of the upper transistors of the half-bridge drivers and the source terminals of the transistors 102 is provided at Vbatt from the battery of the automobile through a power delivery circuit 108 that is external to the integrated circuit 100. The battery of the automobile further provides Vcc supply power for the integrated circuit 100 at Vbatt. The circuit 108 includes a transistor 110 having a source/drain path coupled between the automobile battery and the supply node Vbatt. The control terminal of the transistor 110 is driven with a control voltage generated by a charge pump circuit 112 located on the integrated circuit 100. The transistor 110 functions as a reverse battery protection transistor.

Figure 6:
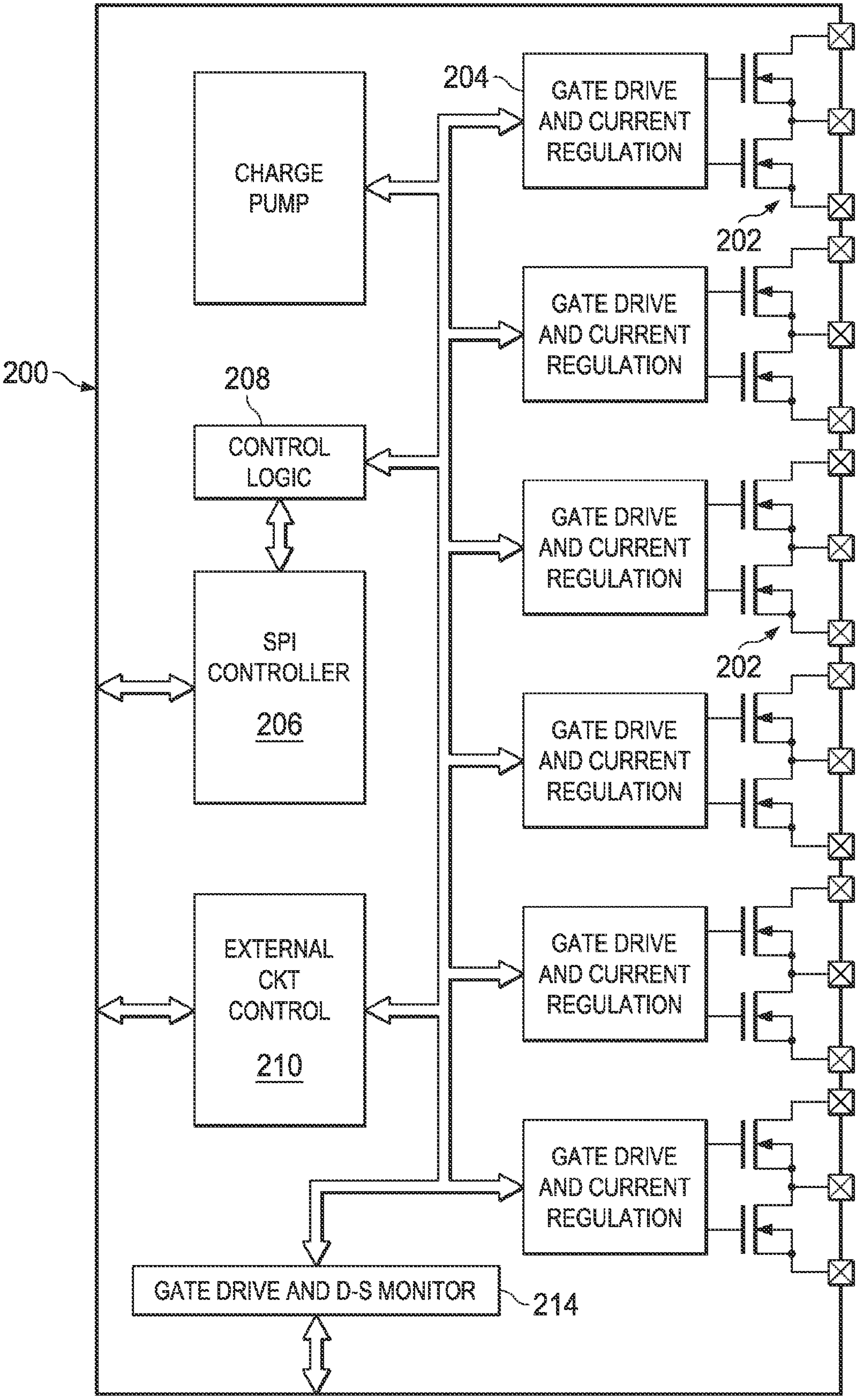

FIG. 6 shows an alternative block diagram of the integrated circuit 200. This circuit 200 shows a plurality of integrated half-bridge circuits 202 each being controlled by a gate drive and current regulation circuit 204. This configuration enables current regulation to be effectuated on each individual half-bridge circuit (see, FIG. 3B).

A SPI controller 206 is provided to enable control interface with the control logic circuitry 208 which may comprise, for example, a microcontroller circuit. The SPI control supports on/off control over the bridge circuits (both high side and low side); on/off control of a trunk/auxiliary output; control over output on time duration (duration 10 ms to 1000 ms, for example). The SPI controller further supports provision of output status: last command executed properly (off/lock/unlock, for example); stall current control (since last SPI command); overcurrent protection on both the high side and low side (short to ground or short to battery); thermal shutdown (since last SPI command); and thermal warning.

An external circuit controller 210 is also provided on the integrated circuit to enable the circuit to control external MOSFETs for a second high current half-bridge (off-chip) or to control a circuit other than motors. For example, solenoid control could be exercised. The outputs of the controller 210 may alternatively provide warnings or other indicators.

A gate drive and drain/source monitor circuit 214 is also included to enable the circuit to control an external (off-chip) power transistor for a higher current half-bridge (for example, an off-chip driver circuit).

With respect to the circuit of FIG. 6, the functional blocks include: six half-bridge circuit (low ohmic MOSFETs); a half-bridge controller (with current regulation loops for each high side and low side half bridge circuit and a mechanism for paralleling a multiplicity of outputs); a charge pump (for example, multi-stage); configurable outputs (digital I/O and analog feedback); SPI I/O (as known in the art); control logic (with watchdog and external configurable I/O).

The multipurpose outputs of the circuit: provide options for both inputs and outputs; provide inputs (for direct drive of selected bridges); provide outputs (both digital and analog). With respect to digital, provision is made for: a global fault bit; an assign any fault bit; a watchdog fail; control pins for external device(s) (such as gate drive (with or w/o charge pump) and logic level); and digital input reflected on a SPI register bit. With respect to analog, provision is made for: current sense out selectable by SPI for one or more drivers in parallel and overall junction temperature or selected output temperature.

Additional features of the circuit may include: providing external MOSFET control to keep the power dissipation/die size to a reasonable level. In this regard: additional multipurpose pins are definable by SPI; muxed analog current feedback is available from drivers; there is direct input control for some drivers; there is a global fault pin; digital outputs are controlled by SPI command; and MOSFET gate drives are supported (1 high side, 1 low side, 1 high side source sense). Another additional feature is a watchdog functionality. Furthermore, the integrated circuit has a reduced pin count (achieved, for example, because pairs of outputs share grounds).

The circuit further supports diagnostic and protection. The protection provided on either or both of the high side and low side includes: shorted load protection; short to battery (STB); and short to ground (STG). STB and STG may be based on time to stall current threshold from initial turn on. If stall current threshold occurs too soon after initial turn on then output is latched off and fault flag is set and the STB fault bit is set in the SPI register. STB and STG may be based on high or low side output current threshold. Part detected that the current is above a threshold for s set amount of time and is latched off. The fault flag is set and the STG bit is set in the SPI register. The determination of which method (time to stall current or exceeding a threshold) depends on whether the faulted output is providing the current limit or the source/sink path. There is also thermal shutdown (TSD) support. Device is latched off, the fault pin is activated and the TSD flag is set in the SPI register. With respect to diagnostics, the circuit supports: fault flags (STB, STG, TSD per output); overvoltage/undervoltage; thermal warning; stall current control flag (stall current control not necessarily a fault condition). All these features are programmable and selectable through the control logic and SPI controller.

External MOSFET control protection includes drain-source (Vds) monitoring. Vds monitoring is performed by measuring the drain-source voltage of an active external MOSFET. When the Vds voltage exceeds a programmed value for a longer than a predetermined duration, the output is shut off and a fault is recorded.

In summary, the circuit provides a single IC for all lock/unlock functions (driver's door only unlock or left side only unlock; all door lock; trunk lid unlock; individual door lock or unlock (configurable outputs); BTSI or rear flip glass solenoid driver (configurable output). The single IC is SPI programmable with a corresponding controller. Parallel input failsafe mode is supported. There is a high level of control available over motor operation. Stall current control occurs by PWM current regulation. Thermal management may be provided by current regulation reduction via duty cycle control. The circuit supports programmable current regulation levels.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A system, comprising:
- a door lock mechanism for an automobile;
- an electric motor configured to actuate the door lock mechanism;
- an integrated circuit motor driver comprising:
  - a half-bridge driver circuit having an output node electrically coupled to said electric motor;
  - a control circuit configured to control driver operation of the half-bridge driver circuit; and
  - a regulator circuit configured to sense and regulate an operational parameter of the half-bridge driver circuit and electric motor;
  - wherein the control circuit is further configured to respond to the regulator circuit and the sensed operational parameter by controlling the driver operation to provide for a regulated operation of the half-bridge circuit and electric motor;
  - wherein said half-bridge driver circuit includes a primary transistor and a secondary transistor coupled in a current mirror configuration, wherein a source-drain path of the primary transistor is configured to supply current to the door lock motor and a source-drain path of the secondary transistor is coupled to an input of the regulator circuit.

2. The system of claim 1, wherein the operational parameter is current sourced by or sunk by said half-bridge circuit during motor operation to actuate the door lock mechanism, and the control circuit is configured to respond to the regulator circuit and the current source by or sunk by said half-bridge circuit by controlling the driver operation to provide for a regulated current being sourced by or sunk by said half-bridge circuit.

3. The system of claim 1, wherein the regulator circuit operates as a pulse width modulation (PWM) controller.

4. The system of claim 1, wherein said control circuit is further configured to control driver operation of the half-bridge driver circuit so as to place the half-bridge driver circuit in a tri-state condition.

5. The system of claim 4, further comprising a back EMF sensing circuit coupled to said motor and configured to sense motor back EMF when said half-bridge driver circuit in said tri-state condition.

6. An integrated circuit configured to control automobile door lock motors, comprising:

a plurality of half-bridge driver circuits integrated within the circuit, each half-bridge driver circuit:

a first transistor having a control terminal and conduction path, the conduction path of the first transistor configured to supply current to a door lock motor;

a second transistor having a control terminal and conduction path, the conduction path of the second transistor configured to sink current from the door lock motor;

a control circuit integrated within the circuit and configured to control driver operation of the half-bridge driver circuits; and a regulator circuit integrated within the circuit and comprising:

a first current sensing resistor coupled to sense the supply current to the door lock motor;

a first comparator configured to compare a voltage at the first current sensing resistor with a first reference signal to thereby generate a first output signal;

a second current sensing resistor coupled to sense the sink current from the door lock motor; and a second comparator configured to compare a voltage at the second current sensing resistor with a second reference voltage and generate a second output signal;

wherein the control circuit is further configured to respond to the regulator circuit and the first and second output signalsby controlling the driver circuit operation to provide for a regulated motor operation.

7. The integrated circuit of claim 6, wherein the regulator circuit operates as a pulse width modulation (PWM) controller.

8. The integrated circuit of claim 6, wherein the regulator circuit has an input node, and said input node is coupled to a drain node of the conduction path of the first transistor or the second transistor in said half-bridge circuit.

9. The integrated circuit of claim 6, wherein said control circuit is further configured to control driver operation of at least one of the half-bridge driver circuits so as to place the half-bridge driver circuit in a tri-state condition.

10. The integrated circuit of claim 6, wherein at least one of the first and the second transistor is comprised of a primary transistor and a secondary transistor coupled in a current mirror configuration, and wherein a conduction path of the primary transistor is electrically coupled to the door lock motor and a conduction path of the secondary transistor is electrically coupled to an input of the regulator circuit.

11. The integrated circuit of claim 8, wherein said drain node is the drain node of the first transistor of the half-bridge circuit.

12. The integrated circuit of claim 8, wherein said drain node is the drain node of the second transistor of the half-bridge circuit.

13. A circuit, comprising:

a first drive transistor having a gate terminal, wherein a source-drain path of the first transistor is configured to be coupled to drive operation of a motor;

a first current sensing resistor coupled to sense current flowing in said motor;

a second drive transistor having a gate terminal, wherein a source-drain path of said second drive transistor coupled in series with source-drain path of said first drive transistor;

a second current sensing resistor coupled to sense current flowing in said motor;

a first comparator configured to compare a voltage at the first current sensing resistor with a first reference voltage and generate a first output signal;

a second comparator configured to compare a voltage at the second current sensing resistor with a second reference voltage and generate a second output signal;

a first flip-flop circuit having a first input configured to receive the first output signal and a second input configured to receive an oscillating signal, said first flip-flop circuit generating a first PWM output signal;

a second flip-flop circuit having a first input configured to receive the second output signal and a second input configured to receive an oscillating signal, said second flip-flop circuit generating a second PWM output signal; and a logic circuit coupled to receive the first PWM output signal and configured to generate a first control signal for application to the gate of the first drive transistor, wherein said logic circuit is further coupled to receive the second PWM output signal and configured to generate a second control signal for application to the gate of the second drive transistor.

14. The circuit of claim 13, wherein a drain terminal of the source-drain path of the first drive transistor is directly connected to an electrical terminal of the motor.

15. The circuit of claim 13, wherein a source terminal of the source-drain path of the first drive transistor is directly connected to an electrical terminal of the motor.

16. The circuit of claim 13, wherein a drain terminal of the source-drain path of the first drive transistor and a source terminal of the source-drain path of the second drive transistor are directly connected to an electrical terminal of the motor.

17. The circuit of claim 13, wherein an input of the first comparator is directly connected to the first resistor and an input of the second comparator is directly connected to the second resistor.

18. The circuit of claim 13, wherein the first and second control signals regulate current passing through the first and second transistors.

19. The circuit of claim 13, wherein the circuit is fabricated as an integrated circuit chip.

20. The circuit of claim 14, wherein the first current sense resistor is coupled is series with a drain terminal of a secondary source-drain path of the first drive transistor.

21. The circuit of claim 15, wherein the first current sense resistor is coupled in series with a source terminal of a secondary source-drain path of the first drive transistor.

22. The circuit of claim 16, wherein the second current sense resistor is coupled in series with a source terminal of a secondary source-drain path of the second drive transistor.

23. The circuit of claim 18, wherein the first and second control signals further configure the first and second transistors into a tri-state mode.

24. The circuit of claim 23, further comprising a back EMF sensing circuit configured to be connected to the electrical terminals of the motor, said back EMF sensing circuit operable to sense motor rotation when said first and second transistors are configured into the tri-state mode.

* * * * *

UNITED STATES PATENT AND TRADEMARK OFFICE

CERTIFICATE OF CORRECTION

PATENT NO. : 9,331,616 B2
APPLICATION NO. : 14/063163
DATED : May 3, 2016
INVENTOR(S) : David F. Swanson It is certified that error appears in the above-identified patent and that said Letters Patent is hereby corrected as shown below:

In the Claims:

At column 13, claim number 6, line number 34, please replace [signalsby] with -- signals by --.

At column 14, claim number 13, line number 3, please replace the phrase [with source-drain path] with the phrase -- with the source-drain path --.

At column 14, claim number 20, line number 49, please replace the phrase [coupled is series] with the phrase -- coupled in series --.

Signed and Sealed this
Second Day of August, 2016

Michelle K. Lee
*Director of the United States Patent and Trademark Office*